Dec. 23, 1924.  1,520,281
T. DUDSON
FOOTBALL, NET BALL, AND THE LIKE
Filed Jan. 24, 1923
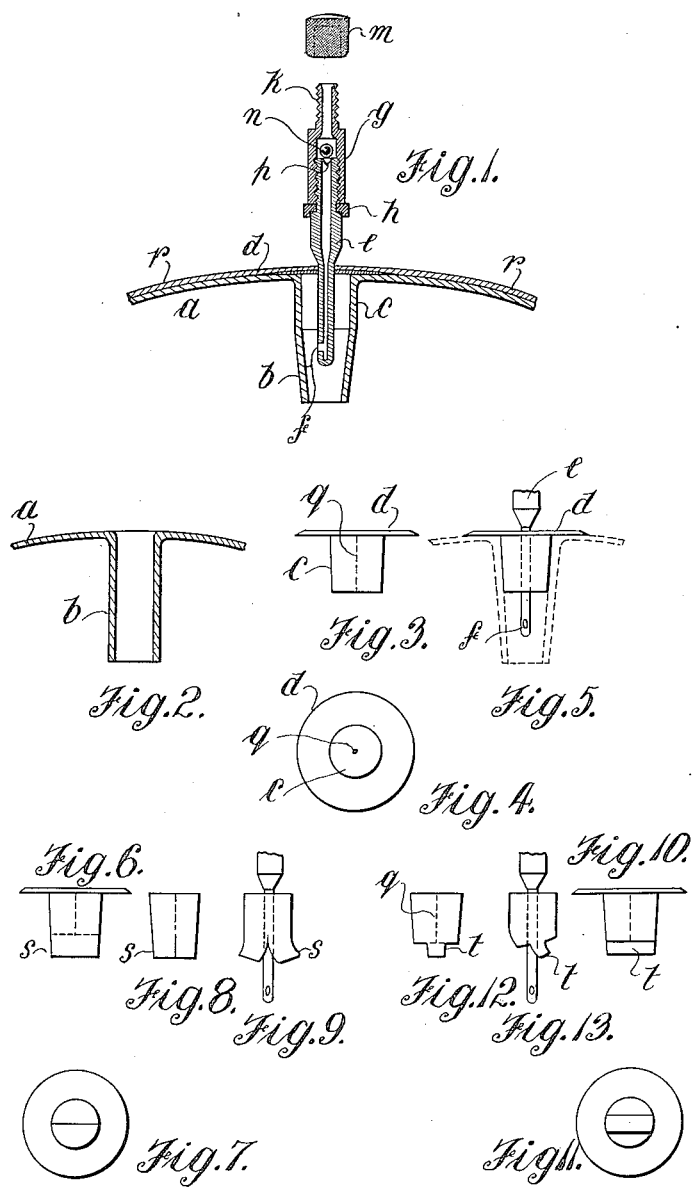

Patented Dec. 23, 1924.

1,520,281

UNITED STATES PATENT OFFICE.

THOMAS DUDSON, OF ABERTRIDWR, NEAR CARDIFF, WALES.

FOOTBALL, NET BALL, AND THE LIKE.

Application filed January 24, 1923. Serial No. 614,703.

*To all whom it may concern:*

Be it known that I, THOMAS DUDSON, a British subject, residing at 42 High Street, Abertridwr, near Cardiff, Glamorganshire, Wales, have invented certain new and useful Improvements in or Relating to Footballs, Net Balls, and the like, of which the following is a specification.

This invention relates to footballs, net balls and other inflatable balls, and refers to a device of the class in question which is adapted to be inflated in a more simple and satisfactory manner, which is a better shape when inflated, and which is less dangerous for the players than those hitherto constructed.

According to the general principle of my invention I provide on or in connection with the inflatable bladder or bag, one or a plurality of plugs or pads or equivalent devices, or a ring composed of a material, which can be penetrated from the outside by means of a device by which air can be pumped into the interior of the bladder, the material from which the pad or plug or the like is formed being of such a nature that owing to its own properties and/or the internal air pressure when the inflating device is withdrawn, it closes together and prevents the escape of the air from the interior when not desired.

In order that the invention may be better understood, it will now be described with reference to the accompanying drawing, which shows by way of example only, several methods of carrying the invention into effect.

In the drawings, Fig. 1 shows a fragmentary sectional elevation of a ball with the invention applied thereto, in the form of a plug, and with an inflating valve in position.

Fig. 2 shows sectional elevation of the bladder and attached tube, as shown in Fig. 1, but detached.

Fig. 3 shows in elevation and Fig. 4 in under plan the plug device, as shown in Fig. 1, detached.

Fig. 5 shows similar view to Fig. 3, but with the inflating valve in position.

Figs. 6 and 7 show similar views to Figs. 3 and 4, but of another form of the device.

Fig. 8 shows side elevation of the plug shown in Fig. 6, Fig. 9 being a similar view, but with inflating valve in position.

Figs. 10, 11, 12 and 13 are similar views to Figs. 6, 7, 8 and 9, but of still another form of the invention.

Referring to Figs. 1–5, $a$ shows the bladder formed or provided with a short rubber tube $b$, extending inwardly (see Fig. 2) from the opening. $c$ is a circular plug or pad of comparatively soft rubber adapted to be pressed into the mouth of this tube. It may further if desired be solutioned in position. $d$ is a circular disc of rubber or the like placed in position, preferably by solution, over the plug and bladder. $e$ is the hollow tubular body of an inflating valve having an opening $f$, towards the end of the reduced portion. This body $e$ has screwing on to the upper end thereof a casing $g$ with a washer $h$ coming between the parts. The upper end of the casing $g$ is formed with an exterior screw thread $k$ upon which an ordinary inflating pump, such as a pump for cycle tires, can be screwed. $m$ is a screw cap also adapted to be screwed on to the threaded portion $k$. Within the upper part of the casing $g$ a chamber is formed in which a ball valve $n$ is adapted to move. This ball $n$ is adapted to come on the top of the body $e$ as shown in the drawing. In this position, air passes down into the body $e$, by two V notches $p$, in the upper edge of the body $e$. These are arranged in diametrically opposite positions. The ball valve $n$ is also adapted to rise by internal pressure and close the inner end of the part $k$, thus preventing escape of air from the ball during inflation. Upon the removal of the pump however, it is desirable to screw the cap $m$ on to the part $k$.

In using the device, the reduced end of the inflating valve is passed through the rubber disc $d$ and plug $c$. This action is assisted, if a needle is previously passed through the parts and removed, leaving a central passage such as indicated at $q$, Figs. 3 and 4.

When the valve device has been thus placed in position, the bladder or the like into the tube $b$ of which the plug $c$ has previously been pressed and if desired solutioned, and upon which the disc $d$ is attached, is inserted into the interior of the cover, such as $r$, Fig. 1.

The bladder is inserted through the opening to the middle of which the protruding valve is brought. The opening is now laced up and after this the bladder is inflated. When the necessary pressure is reached, the valve is withdrawn, and owing to the internal pressure and/or the soft nature of the material of the plug, the hole through which the valve has been withdrawn closes and a perfect air seal is obtained.

Should it be desired to deflate the football, it is simply necessary to reinsert the valve like device and establish communication between the interior of the bladder and the outside of the ball.

Should the rubber plug or pad become destroyed, through frequent use, a fresh one can be easily placed in position.

The form of the plug like device shown in Figs. 6-9, is similar to that already described except that the lower part has a diametric slit S therein which guides the insertion of the reduced end of the inflating valve and also acts as additional securing means against escape of air when the valve is withdrawn.

In Figs. 10 to 13, the plug again is similar to that in Figs. 1-5, except that a ridge t is left on the bottom, which is not pierced by the passage q, the reduced end of the inflating valve upon insertion, going on one side or the other as indicated in Fig. 13.

In some instances, I may provide two inwardly directed tubes, one coming diametrically opposite the other, each of the tubes being provided with its own plug or pad, so that when one of them becomes destroyed, it can be permanently covered in by means of a patch and the other one utilized; or in some cases the tubes may be dispensed with and one or more plugs may be solutioned or otherwise permanently attached, so that they come in appropriate positions in the bladder or air bag, so that any one of these plugs can be brought into position in relation to the lacing aperture, for purposes of inflation.

In some instances, I may provide a complete circumferential band of soft rubber or. analogous material through which the inflating device may be inserted.

In some cases, I may use in connection with the inner end of the plug, a flap or strip of rubber or other suitable material adapted, owing to its own springiness or under the internal air pressure, to be brought down over the bottom of the hole after the removal of the inflating instrument, thus increasing the security of the device, the said flap or strip being adapted to be pushed out of the way or stretched by the inner end of the inflating instrument when the latter is inserted.

In some instances, in order to increase the efficiency, the inflating device may be provided with a screw thread or be of corkscrew shape on the exterior.

It is preferred to provide the opening in the cover with a greater number of lacing holes than usually provided, and to use a much finer lace, such for example as a waxed thread. This may be fastened at one end and then threaded by a needle or the like through the lacing holes as desired and afterwards the needle may be passed through the material of the cover and the projecting end of the thread cut off flush with the cover, or in some cases the free end of the thread may be turned beneath the already laced portion.

Deflation may be carried out especially where the plug and disc are not solutioned in position, by raising the disc or flange and withdrawing the plug, the replacement of the plug on to the bladder being quite easy, upon withdrawing the bladder from the outer case.

Although certain particular forms of the invention have been described, it is obvious that it is not limited thereto, but may be carried into effect in many ways, within the scope of the claims.

What I claim as my invention and desire to secure by Letters Patent of the United States of America is:

1. An inflatable game ball, comprising an outer covering member, having an aperture to receive a pump valve an inner member having an inwardly extending tube, and a plug of elastic material in said tube and having a bore through which the ball may be inflated, said bore being normally closed by the elasticity of the material of the plug.

2. An inflatable game ball, comprising an outer covering member, an inner member having an inwardly extending tube, and a plug of elastic material in said tube and having a bore through which the ball may be inflated, said bore being normally closed by the elasticity of the material of the plug, and a radially projecting flange at the outer end of the plug and arranged between the outer and inner members.

In witness whereof I affix my signature.

THOMAS DUDSON.